(12) United States Patent
Vu (10) Patent No.: US 8,417,842 B2
(45) Date of Patent: Apr. 9, 2013

(54) VIRTUAL DIRECT MEMORY ACCESS (DMA) CHANNEL TECHNIQUE WITH MULTIPLE ENGINES FOR DMA CONTROLLER

(75) Inventor: Mieu Vu, Austin, TX (US)

(73) Assignee: Freescale Semiconductor Inc., Austin, TX (US)

( * ) Notice: Subject to any disclaimer, the term of this patent is extended or adjusted under 35 U.S.C. 154(b) by 582 days.

(21) Appl. No.: 12/122,340

(22) Filed: May 16, 2008

(65) Prior Publication Data

US 2009/0287857 A1 Nov. 19, 2009

(51) Int. Cl.
G06F 13/28 (2006.01)
(52) U.S. Cl. ............................................. 710/22
(58) Field of Classification Search .................. 710/22
See application file for complete search history.

(56) References Cited

U.S. PATENT DOCUMENTS

| | | | |
|---|---|---|---|
| 5,875,352 A | 2/1999 | Gentry et al. | |
| 6,065,100 A | 5/2000 | Schafer et al. | |
| 6,260,081 B1 * | 7/2001 | Magro et al. | 710/22 |
| 6,553,487 B1 | 4/2003 | Sukonik et al. | |
| 6,851,030 B2 | 2/2005 | Tremaine | |
| 2004/0123301 A1 | 6/2004 | Collins et al. | |
| 2005/0080943 A1 | 4/2005 | Pafumi et al. | |
| 2005/0204074 A1 * | 9/2005 | Gray et al. | 710/22 |
| 2007/0073924 A1 * | 3/2007 | Kuroki et al. | 710/22 |
| 2007/0204073 A1 * | 8/2007 | Chen et al. | 710/22 |
| 2008/0098148 A1 * | 4/2008 | McGee et al. | 710/305 |

* cited by examiner

Primary Examiner — Chun-Kuan Lee
Assistant Examiner — Brooke Taylor
(74) Attorney, Agent, or Firm — Zagorin O'Brien Graham LLP (57) ABSTRACT

A virtual DMA channel technique in which a generally larger number of DMA channels are mapped to a generally smaller number of DMA engines can provide a configuration in which switches amongst DMA engines (and therefore amongst a current working set of DMA channels currently mapped thereto) can be accomplished without context switch latency. Accordingly, as long as contents of the current working set can be appropriately managed, many changes (whether or nor priority based) between a current active DMA channel and a next runnable DMA channel can be accomplished without incurring a context switch latency such as normally associated with loading/restoring and/or saving DMA context information. In some embodiments, a working set or replacement strategy that seeks to cache a most frequently (or most recently) used subset of virtual DMA channels is employed. In some embodiments, a set- or frame-oriented variants of such strategies may be employed.

20 Claims, 7 Drawing Sheets

| DMAU[2:0] SHARED DMA UNITS | | | MFUVC[4:0] MOST FREQUENTLY USED VIRTUAL CHANNEL | DESCRIPTION |
|---|---|---|---|---|
| 0 | 0 | 0 | 00010 | VIRTUAL CHANNEL 2 IS THE MOST FREQUENTLY USED OF DMA0 UNIT |
| 0 | 0 | 1 | 00100 | VIRTUAL CHANNEL 4 IS THE MOST FREQUENTLY USED OF DMA1 UNIT |
| 0 | 1 | 0 | 01001 | VIRTUAL CHANNEL 9 IS THE MOST FREQUENTLY USED OF DMA2 UNIT |
| 0 | 1 | 1 | 01100 | VIRTUAL CHANNEL 12 IS THE MOST FREQUENTLY USED OF DMA3 UNIT |
| 1 | 0 | 0 | 10000 | VIRTUAL CHANNEL 16 IS THE MOST FREQUENTLY USED OF DMA4 UNIT |
| 1 | 0 | 1 | 10101 | VIRTUAL CHANNEL 21 IS THE MOST FREQUENTLY USED OF DMA5 UNIT |
| 1 | 1 | 0 | 11000 | VIRTUAL CHANNEL 24 IS THE MOST FREQUENTLY USED OF DMA6 UNIT |
| 1 | 1 | 1 | 11100 | VIRTUAL CHANNEL 28 IS THE MOST FREQUENTLY USED OF DMA7 UNIT |

FIG. 8

| DMA SOURCE | DMA EVENT | DMAU[2:0] | | | VDC[4:0] | CE (CHANNEL ENABLE) | VDC (DMA CHANNEL) |
|---|---|---|---|---|---|---|---|
| | REQ[0] | 0 | 0 | 0 | 00000 | 0/1 | 0 (0) |
| | REQ[1] | 0 | 0 | 0 | 00001 | 0/1 | 1 (1) |
| | REQ[2] | 0 | 0 | 0 | 00010 | 0/1 | 2 (2) |
| | RESERVED | 0 | 0 | 0 | 00011 | 0/1 | RESERVED |
| | REQ[3] | 0 | 0 | 1 | 00100 | 0/1 | 4 (3) |
| | REQ[4] | 0 | 0 | 1 | 00101 | 0/1 | 5 (4) |
| | REQ[5] | 0 | 0 | 1 | 00110 | 0/1 | 6 (5) |
| | RESERVED | 0 | 0 | 1 | 00111 | 0/1 | RESERVED |
| | REQ[6] | 0 | 1 | 0 | 01000 | 0/1 | 8 (6) |
| | REQ[7] | 0 | 1 | 0 | 01001 | 0/1 | 9 (7) |
| | REQ[8] | 0 | 1 | 0 | 01010 | 0/1 | 10 (8) |
| | RESERVED | 0 | 1 | 0 | 01011 | 0/1 | RESERVED |
| | REQ[9] | 0 | 1 | 1 | 01100 | 0/1 | 12 (9) |
| | REQ[10] | 0 | 1 | 1 | 01101 | 0/1 | 13 (10) |
| | REQ[11] | 0 | 1 | 1 | 01110 | 0/1 | 14 (11) |
| | RESERVED | 0 | 1 | 1 | 01111 | 0/1 | RESERVED |
| | REQ[12] | 1 | 0 | 0 | 10000 | 0/1 | 16 (12) |
| | REQ[13] | 1 | 0 | 0 | 10001 | 0/1 | 17 (13) |
| | REQ[14] | 1 | 0 | 0 | 10010 | 0/1 | 18 (14) |
| | RESERVED | 1 | 0 | 0 | 10011 | 0/1 | RESERVED |
| | REQ[15] | 1 | 0 | 1 | 10100 | 0/1 | 20 (15) |
| | REQ[16] | 1 | 0 | 1 | 10101 | 0/1 | 21 (16) |
| | REQ[17] | 1 | 0 | 1 | 10110 | 0/1 | 22 (17) |
| | RESERVED | 1 | 0 | 1 | 10111 | 0/1 | RESERVED |
| | REQ[18] | 1 | 1 | 0 | 11000 | 0/1 | 24 (18) |
| | REQ[19] | 1 | 1 | 0 | 11001 | 0/1 | 25 (19) |
| | REQ[20] | 1 | 1 | 0 | 11010 | 0/1 | 26 (20) |
| | RESERVED | 1 | 1 | 0 | 11011 | 0/1 | RESERVED |
| | REQ[21] | 1 | 1 | 1 | 11100 | 0/1 | 28 (21) |
| | REQ[22] | 1 | 1 | 1 | 11101 | 0/1 | 29 (22) |
| | REQ[23] | 1 | 1 | 1 | 11110 | 0/1 | 30 (23) |
| | RESERVED | 1 | 1 | 1 | 11111 | 0/1 | RESERVED |

*FIG. 9*

VIRTUAL DIRECT MEMORY ACCESS (DMA) CHANNEL TECHNIQUE WITH MULTIPLE ENGINES FOR DMA CONTROLLER

BACKGROUND

1. Field

This disclosure relates generally to data processing systems, and more specifically, to techniques for supporting direct memory access (DMA) operations.

2. Related Art

The desirability of advanced multimedia, graphics and even gaming capabilities and features in small-form-factor and power-budget-limited devices, such as mobile phones, personal digital assistants and media players is growing. To provide such capabilities, modern designs are often equipped with high-performance CPUs, high-bandwidth buses and large memories as well as with mechanisms that allow the CPUs to intelligently offload responsibility for data transfers between peripherals and memory using direct memory access (DMA) techniques.

DMA techniques have a long history in computer systems and numerous design variations have been employed, but generally speaking DMA performs the task of transferring blocks of data from one place to another (e.g., between an I/O device and memory, between memory locations as in scatter-gather operations, etc.). Although such transfers are often initiated by a CPU, execution of the transfer does not typically require further CPU involvement. As a result, the CPU is able to perform other functions concurrent with DMA-mediated transfers. This division of labor can be desirable in many designs, but particularly in designs in which peripheral I/O operates at data transfer speeds slower than supported for memory accesses by the CPU, and those in which high data rate transfers such as for audio playback, streaming video or wireless communications are to be supported concurrently with computations performed by the CPU.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Direct memory access (DMA) operations are supported in numerous processor, device, system and system on a chip (SoC) implementations to coordinate the transfer of data from one store or location to another (e.g., between an I/O device and memory, between memory locations, etc.) without significant CPU involvement in the actual data transfer. By off-loading performance of the transfer to DMA facilities, processor, device and system implementations can often meet data throughput design requirements.

As typically implemented, DMA facilities include one or more specialized auxiliary processor(s) that transfer data between locations in memory and/or peripheral input/output (I/O) devices and memory without intervention of the processor core(s) or CPUs. Thus, DMA facilities are typically external to the CPU and can act as a master on the bus or other communications facility. Multiple DMA channels are typically supported and usually correspond to particular DMA transfers or devices. Often, a processor initiates a DMA-mediated transfer by setting values in DMA registers to specify, for a particular DMA channel, source and destination addresses as well as a counter to control the number of units of data to be transferred. A corresponding one of the auxiliary processor handles the DMA transfer. In some implementations, the auxiliary processor is embodied as a multi-channel DMA controller and once the DMA transfer is completed, or if the DMA channel must yield a higher priority DMA access, the controller either automatically performs the DMA channel switch or interrupts the CPU to indirectly initiate such a switch. In some implementations, auxiliary processor support for DMA may be distributed, e.g., amongst peripheral I/O devices. In some implementations, auxiliary processor support is centralized but dedicated to particular transfers, e.g., as a DMA engine for each peripheral I/O device. In such implementations, some facility for arbitrating amongst auxiliary processors for use of shared resources, such as a DMA bus, is typically provided. In other implementations, a single auxiliary processor or DMA engine is provided and shared amongst all the competing DMA channels and pending DMA transfers. A context switch from one DMA channel to the next loads the auxiliary process with parameters for a next active DMA channel/transfer, while saving parameters for the previous DMA channel/transfer.

As next-generation wireless devices such as PDAs, smart phones and other portable devices with media players, as well as gaming consoles and multimedia devices all push latency and data throughput design requirements, demands on related DMA facilities tend to increase as well. Unfortunately, in many of these types of designs, form-factor, part count and power budgets can all impose significant constraints. Therefore, mere replication of auxiliary processor support may not be a winning design strategy. On the other hand, context switching overheads often associating with multiplexing use of a single auxiliary processor resource can adversely affect DMA transfer latencies and ultimately the user experience.

As a result, techniques are desired that allow DMA implementations to better balance design constraints typical of portable and/or handheld devices (including form-factor, part count and power budget constraints) with performance demands.

It has been discovered that a virtual DMA channel technique in which a generally larger number of DMA channels are mapped to a generally smaller number of DMA engines can provide a configuration in which switches amongst DMA engines (and therefore amongst a current working set of DMA channels currently mapped thereto) can be accomplished without context switch latency. Accordingly, as long as contents of the current working set can be appropriately managed, many changes (whether or not priority based) between a current active DMA channel and a next runnable DMA channel can be accomplished without incurring a context switch latency such as normally associated with loading/restoring and/or saving DMA context information.

In some embodiments, a working set or replacement strategy that seeks to cache a most frequently (or most recently) used subset of virtual DMA channels is employed Context information for each virtual DMA channel of a working set may be cached with a respective DMA engine. As a result, switches amongst the DMA engines, and therefore amongst respective ones of the current subset of virtual DMA channels, can be performed without latencies that might otherwise be associated with saving or restoring context information. In some embodiments, a set- or frame-oriented variant of such strategies may be employed. In some embodiments, latency associated with loading/restoring and/or saving DMA context information to/from the working set can be hidden (at least for some queued DMA requests). For example, saving and restoring can be performed while a prior runnable one of the virtual DMA channels is active, such that context information for a next runnable virtual DMA channel becomes cached with a respective DMA engine and available for activation without context switch latency.

For concreteness, this disclosure focuses on certain illustrative DMA architectures, data transfer busses and interconnects, memory interfaces, sets and types of peripheral I/O devices, encodings of DMA context information, mappings of virtual DMA channels to DMA engines, etc. For example, in some embodiments, one of plural DMA engine is selectively coupled to an AHB- or AXI-type interface (e.g., in accord with AMBA Specifications published by ARM Ltd.) in which access to a target device is controlled through a multiplexer. In some embodiments, burst DMA is supported. In some embodiments, suites of peripheral I/O devices and memory include external codecs, modem memory/buffers, and media interface devices. For example, in some embodiments, peripheral I/O devices include instances suitable for wireless data communications such as over cellular wide area networks (WANs), analog or digital cellular, CDMA (code division multiple access) and variants thereof, GSM, GPRS (general packet radio service) and/or 3G systems such as UMTS (universal mobile telecommunication service) systems, EDGE (enhanced data rate for GSM), short range wireless networks (as WLANs), such as IEEE 802.11, Bluetooth, etc, as well as serial audio port (SAP) devices and media interface devices such as for communications in accord with universal serial bus (USB), secure digital host controller (SDHC), synchronous audio interface, S/PDIF digital interconnect format signaling, UART and other protocols/interfaces. In some embodiments, fixed, set-oriented mappings of virtual DMA channels to DMA engines may be employed, while in others, more flexible mappings may be employed. Of course, techniques described herein have broad applicability to other DMA architectures and implementations, but will be understood and appreciated by persons of ordinary skill in the art based on the illustrated context(s).

Accordingly, in view of the foregoing and without limitation on the range of DMA architectures, data transfer busses or interconnects, device suites and virtual-to-physical mappings conventions that may be employed in embodiments of the present invention, we describe certain illustrative embodiments.

System Embodiments and Direct Memory Access (DMA), Generally

Figure 1:
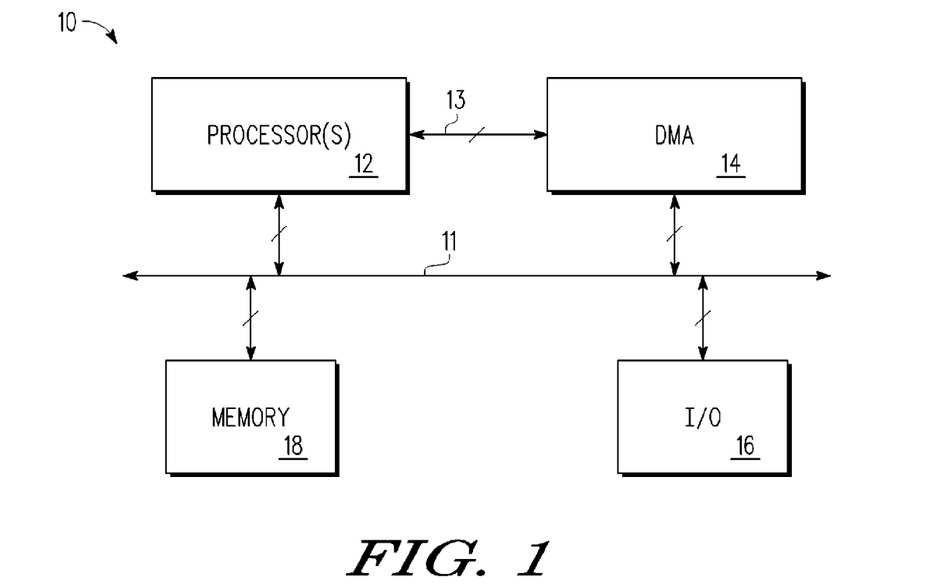
FIGS. 1 and 2 are block diagrams of respective data processing systems, each in accordance with one or more embodiments of the present invention.

FIG. 1 illustrates a data processing system 10 consistent with some embodiments of the invention. In general, data processing system 10 may be implemented on a single integrated circuit or using a plurality of integrated circuits. In some cases, data processing system 10 may be implemented as a system-on-chip. In the illustrated configuration, data processing system 10 includes processor(s) 12, direct memory access (DMA) controller 14, I/O devices 16, and memory 18. Components of data processing system 10 are interconnected and interoperate using any suitable techniques. For simplicity, interconnection amongst major functional blocks is illustrated using bus 11, although persons of ordinary skill in the art will recognize that any of a variety of interconnection techniques and topologies may be employed without departing from the present invention. DMA requests, interrupts, completion signals and other coordination indications or status are communicated between processor(s) 12 and DMA controller 14 via any suitable interconnection, shown collectively in FIG. 1 as interconnect(s) 13. In general, DMA controller 14 may be implemented on the same integrated circuit chip as processor(s) 12 or may be implemented as a separate integrated circuit or module.

Typically, implementations of processor(s) 12 include a fetch buffer for storing instructions to be executed by the processor(s), decoder and sequencing logic, one or more execution units, and register storage, together with suitable data, instruction and control paths. At any given time, consistent with a computation performed by processor(s) 12, units of program code (e.g., instructions) and data reside in memory 18, in one or more levels of cache(s) and/or in processor stores (such as a fetch buffer, registers, etc.) At least some of that program code may initiate DMA transfers as described in greater detail below. In general, any of a variety of memory hierarchies may be employed, including designs that separate or commingle instructions and data in memory or cache. Memory 18 (or any portion thereof) may be located on the same integrated circuit as a processor, may be located on a different integrated circuit than processor(s) 12 or may span multiple integrated circuits. In some designs, memory 18 may be shared by multiple processors. In addition, memory 18 may include storage of any suitable type, such as, for example, read only memory (ROM), random access memory (RAM), non-volatile memory (e.g., Flash), etc.

Although it is important to emphasize that memory 18 may have a somewhat hierarchical or distributed character in some embodiments, for clarity and focus, the disclosure that follows tends to ignore the potentially hierarchical nature of storage and possibility of shared and/or distributed memory configurations. Instead, the description focuses illustratively on DMA transfers to and/or from memory without regard to any distribution of underlying storage, caching mechanisms or coherence protocols that may be implemented in any particular embodiment. In this regard, persons of ordinary skill in the art will appreciate that any of a variety of memory models and suitable cache- and/or coherence-aware techniques may be employed, if desired, without departing from the spirit and scope of the present invention.

DMA controller 14 includes plural DMA engines (not specifically shown FIG. 1) that transfer data between locations in memory 18 and/or between input/output (I/O) devices 16 and memory 18 without intervention of processor(s) 12. Thus, in the illustrated configuration, DMA controller 14 is configured to act (in furtherance of at least some DMA transfers) as a master on bus 11. As described in greater detail below, DMA controller 14 supports multiple virtual DMA channels by dynamically mapping a current working set thereof to the plural DMA engines. In general, individual virtual DMA channels correspond to particular DMA transfers or devices (e.g., to a DMA transfer between one of I/O devices 16 and memory 18, to a scatter-gather DMA transfer between one set of locations in memory 18 and another, etc.). Often, one of the processor(s) 12 initiates the DMA transfer by setting values in DMA registers to specify, for a particular virtual DMA channel, source and destination addresses, a byte count, etc. In some embodiments, DMA register values reside in a DMA channel buffer that resides in storage (e.g., memory 18) external to DMA controller 14. DMA register values are swapped in and out of DMA controller 14 in accordance with a dynamically varying current working set of virtual DMA channels so that appropriate DMA register values are available to respective DMA engines.

Figure 2:
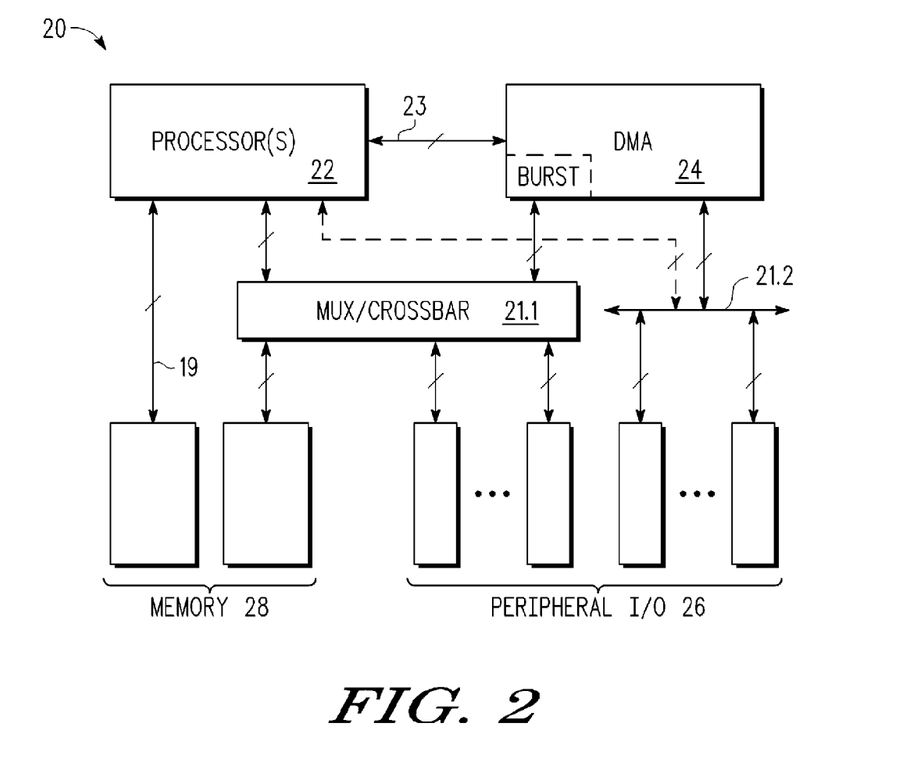

FIG. 2 illustrates a data processing system 20 somewhat analogous to that illustrated above with reference to FIG. 1, but which includes certain variations or additional features that are typical of, or at least consistent with, some embedded processor implementations. As before, data processing system 20 may be implemented on a single integrated circuit or using a plurality of integrated circuits, although embedded system-on-chip embodiments may tend to implement a greater proportion of the processor, DMA interconnect, memory and I/O resources on a single chip. In the illustrated configuration, data processing system 20 includes processor(s) 22, direct memory access (DMA) controller 24, I/O devices 26, and memory 28.

As before, components of the data processing system are interconnected and interoperate using any suitable techniques; however, for purposes of illustration, FIG. 2 shows several interconnect pathways including a multiplexer (MUX) or crossbar interconnect 21.1 and bus 21.2. MUX/crossbar interconnect 21.1 provides a switched data path between at least some of I/O devices 26 and a portion of memory 28. In the illustrated configuration, burst mode data transfers are supported using bus-type protocols (e.g., in accord with AHB- or AXI-type interfaces documented in AMBA Specifications published by ARM Ltd.). At least some of I/O devices 26 are coupled to bus 21.2 and DMA controller 24 supports DMA between and amongst devices and memory coupled to either interface. In general, some portions or memory 28 (e.g., instruction memory, non-volatile storage, etc.) may be accessed by processor(s) 12 via path 19 independent of MUX/crossbar interconnect 21.1 or bus 21.2. An optional direct (non DMA transfer) path between processor(s) 12 and bus 21.2 is also illustrated.

As before, DMA requests, interrupts, completion signals and other coordination indications or status are communicated between processor(s) 22 and DMA controller 24 via any suitable interconnection, shown collectively in FIG. 2 as interconnect(s) 23. In some SoC embodiments, DMA controller 24 is implemented on the same integrated circuit chip as processor(s) 22, MUX/crossbar interconnect 21.1, at least some of I/O devices 26 and at least some portions of memory 28.

Virtual DMA Channel Technique with Multiple DMA Engines

Figure 3:
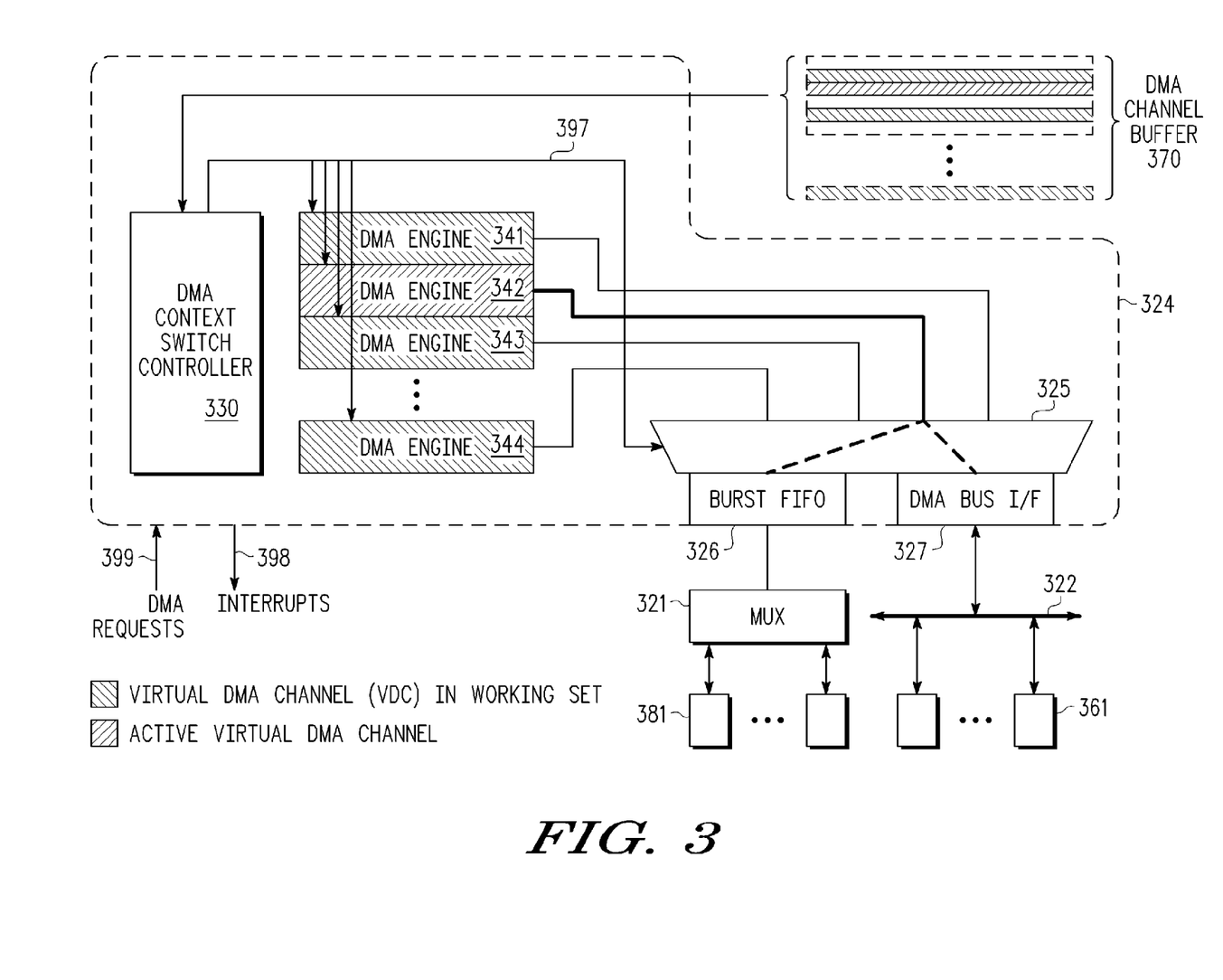
FIG. 3 is a block diagram of a direct memory access (DMA) controller in accordance with one or more embodiments of the present invention.

FIG. 3 is a block diagram of a DMA controller 324 in accordance with one or more embodiments of the present invention. Note that DMA controller 324 is illustrated in a context consistent with FIG. 2 and in which interfaces to both a MUX/crossbar interconnect 321 and a bus 322 are illustrated. Nonetheless, based on the description herein, persons of ordinary skill in the art will appreciate adaptations and/or simplifications consistent with other implementation or use contexts (such as illustrated in FIG. 1 or otherwise). In general, DMA controller 324 is responsive to DMA requests 399 from processors or other masters and typically supplies interrupts 398, completion signals and other coordination indications or status to such processors and masters.

Figure 8:
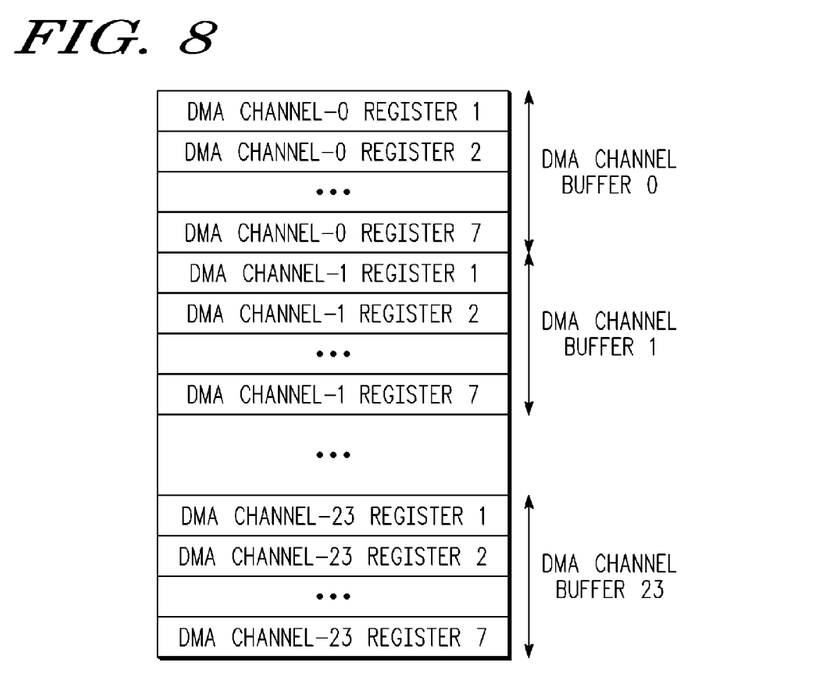
FIG. 8 illustrates DMA channel buffer codings suitable for use in connection with one or more embodiment of the present invention.

DMA controller 324 includes plural DMA engines (341, 342, 343 ... 344) and a DMA context switch controller 330 that manages a set of multiple virtual DMA channels (VDCs) more numerous than the DMA engines by dynamically mapping a current working set of the virtual DMA channels thereto. In the illustrated configuration, context information for the virtual DMA channels, including that for virtual DMA channels which are not part of the current working set, resides in DMA channel buffer 370. Typically, at least a portion of the information associated with DMA channel buffer 370 is represented in storage external to DMA controller 324 (e.g., in addressable memory) and loading/restoring and saving context information from and to such storage can incur significant overhead. Context information for a virtual DMA channel can include values associated with logical DMA registers to specify, for a particular virtual DMA channel, source and destination addresses, a current byte count, etc. FIG. 8 illustrates one suitable organization for memory-resident DMA channel buffer entries for use in accordance with some embodiments of the present invention. In part to reduce overhead associated with loading/restoring and/or saving such information, DMA controller 324 includes multiple DMA engines (341, 342, 343 ... 344) and context information for a working set of virtual DMA channels remains loaded into respective DMA engines. In this way, context information for each virtual DMA channel of a working set can be cached with a respective DMA engine and DMA context switch controller 330 may switch amongst the working set of virtual DMA channels without latencies that might otherwise be associated with loading/restoring/saving context information for active and next runnable ones of the virtual DMA channels.

Note that, for simplicity, and since from a DMA controller perspective loading context information into a DMA engine (e.g., for a first time) is not significantly different from restoring context information (e.g., that initially loaded, then saved after completion or upon pre-emption of a corresponding DMA transfer, and then re-loaded) thereto, the terms "loading" and "restoring" are used somewhat interchangeably relative to context information. Also note that, although "saving" of at least a portion of the context information may be omitted in some situations (e.g., for successfully completed DMA transfers), more generally, saving of context information may contribute to overheads and DMA context switch latency, if required.

Referring to FIG. 3, DMA context switch controller 330 controls which of the DMA engines is coupled to appropriate DMA interfaces at any given time. For example, in the illustrated case, control 397 directs multiplexer (or steering logic) 325 to couple DMA engine 342 to interfaces (here 326 and 327) associated with memory and/or I/O devices involved in a DMA transfer of the currently active virtual DMA channel.

Other DMA engines (e.g., 341 and 343 . . . 344) are ready for DMA transfers that are queued or which (based on working set or replacement strategies described in greater detail below) may be viewed (by DMA context switch controller 330) as likely to be active in the future.

In the illustrated case, the active virtual DMA channel transfers data between an I/O device 361 accessed via DMA bus interface 327 (and bus 322) and memory accessed using burst transfer protocols via burst FIFO 326 (and MUX/interconnect 321). However, more generally, the data transfers could be between memory or devices that are both accessed by one of the interfaces (e.g., 326 or 327) or between different sets of locations in a same memory (or device). Transfers via MUX/interconnect 321 are typically supported using bus-type protocols (e.g., in accord with AHB- or AXI-type interfaces documented in AMBA Specifications published by ARM Ltd.) in which case, addressing of the appropriate device or memory is in accord with the operative protocols. Alternatively, in other MUX/interconnect implementations, a separate control (not shown) may be provided.

Note that, while FIG. 3 illustrates a situation in which a single one of the DMA engines (and an associated virtual DMA channel) is active and remaining DMA engines (and virtual DMA channels) are ready but inactive, it is possible that in other situations or implementations, multiple (though less than all) of the DMA engines could be concurrently active assuming non-conflicting memory and/or I/O targets and available routing and/or interconnect resources.

Figure 4:
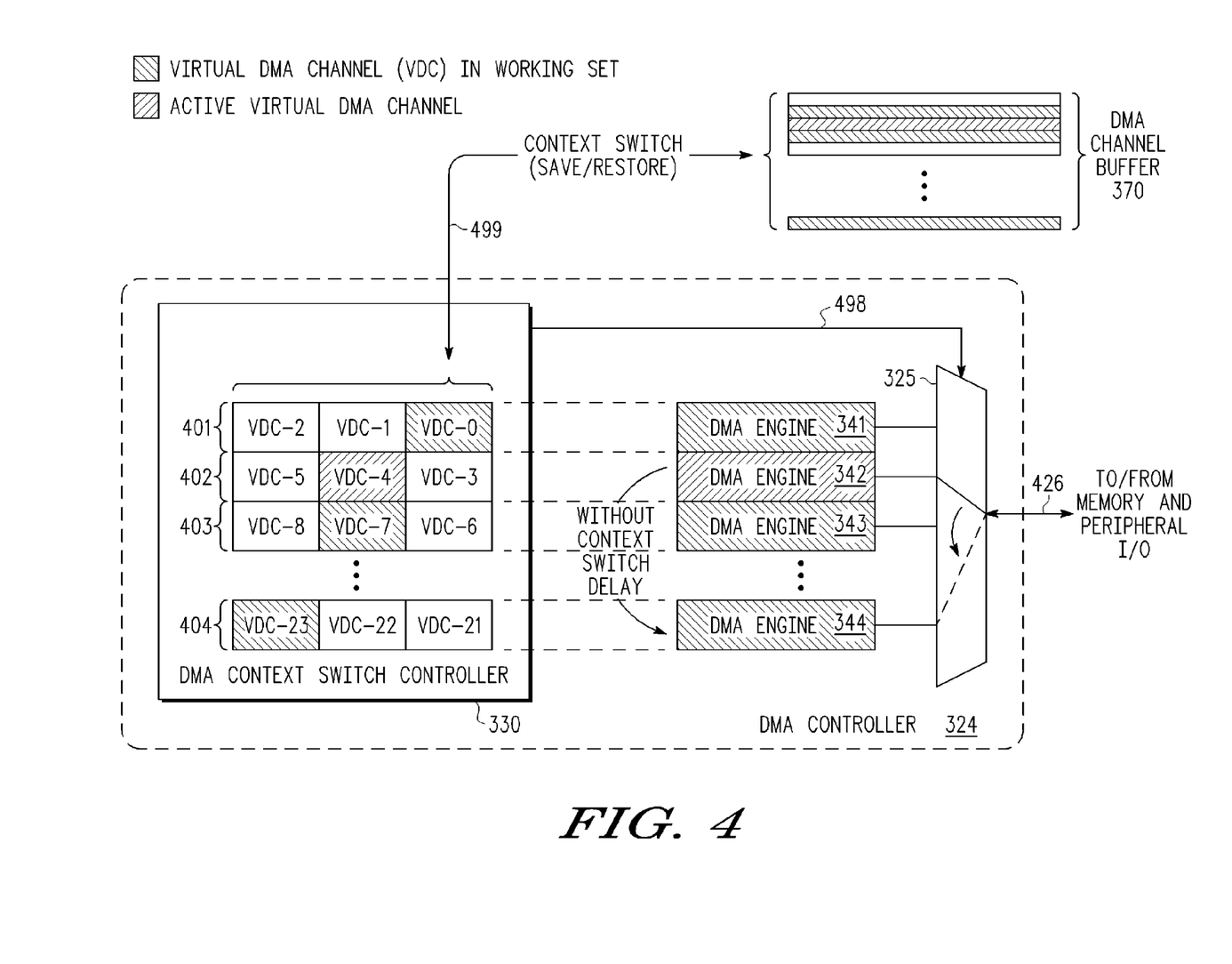
FIG. 4 is a block diagram that illustrates a transition between virtual DMA channels without context switch delay using a DMA controller in accordance with one or more embodiments of the present invention.

Turning now to FIG. 4, a transition amongst virtual DMA channels of a current working set is illustrated using representative components described above with reference to FIG. 3. In connection with DMA context switch controller 330, a set- or frame-oriented mapping of twenty-four (24) virtual DMA channels (VDC-0 . . . VDC-23) is illustrated in which eight (8) sets (401, 402, 403 . . . 404) of three (3) virtual DMA channels are mapped to respective ones of the DMA engines (341, 342, 343 . . . 344). In the illustrated situation, context information for a working set of virtual DMA channels (including virtual DMA channels VDC-0, VDC-4, VDC-7 and VDC-23) is currently loaded into respective ones of the DMA engines. DMA engine 342 and associated virtual DMA channel VDC-4 are active. Remaining virtual DMA channels (e.g., VDC-2, VDC-2, VDC-3, VDC-5, VDC-6, VDC-8 . . . VDC-21 and VDC-22) are not part of the current working set and context information (e.g., DMA register values, etc.) therefor is represented in DMA channel buffer 370 if defined and/or used.

Assuming for the sake of illustration that virtual DMA channel VDC-23 is the next runnable DMA channel, upon completion of the current active DMA transfer (or if VDC-23 corresponds to a higher priority transfer) upon pre-emption of the current active DMA transfer, DMA context switch controller 330 directs multiplexer 325 (via control 498) to decouple DMA engine 342 from DMA interfaces 426 and to instead couple a DMA engine associated with the next runnable DMA (here DMA engine 344) to appropriate ones of DMA interfaces 426. Because context information is already loaded with (or is otherwise accessible to) DMA engine 344, the transition from virtual DMA channel VDC-4 to VDC-23 can be accomplished without context switch delay. In contrast, for an immediate (e.g., pre-empting) transition to a virtual DMA channel that is not a member of the current working set (e.g., to virtual DMA channel VDC-21), a context switch (499) that loads/restores context information for virtual DMA channel VDC-21 from DMA channel buffer 370 and saves displaced context information for a corresponding member of the working set (e.g., for virtual DMA channel VDC-23) is performed by DMA context switch controller 330.

Note that while references to virtual DMA channels are neatly and sequentially ordered in the illustrated situation (e.g., virtual DMA channels VDC-0 . . . VDC-2 are mapped to a first DMA engine, VDC-3 . . . VDC-5 to a second, and so on) and that a fixed set-oriented mapping of virtual DMA channels to DMA engines may be employed in some embodiments, other embodiments may employ other mappings. Indeed, in some embodiments, working sets and replacement strategies need not have a set-orientation at all and virtual DMA channels that are not members of the current working set need not have any a priori association with a particular DMA engine. That said, illustration of DMA controller operation using set-oriented mappings tends to simplify implementation logic and provides a useful and concrete framework for this description. Accordingly, though without limitation, many of the examples and illustrations that follow build on a descriptive framework in which set-oriented mappings of virtual DMA channels to DMA engines are employed.

Figure 5:
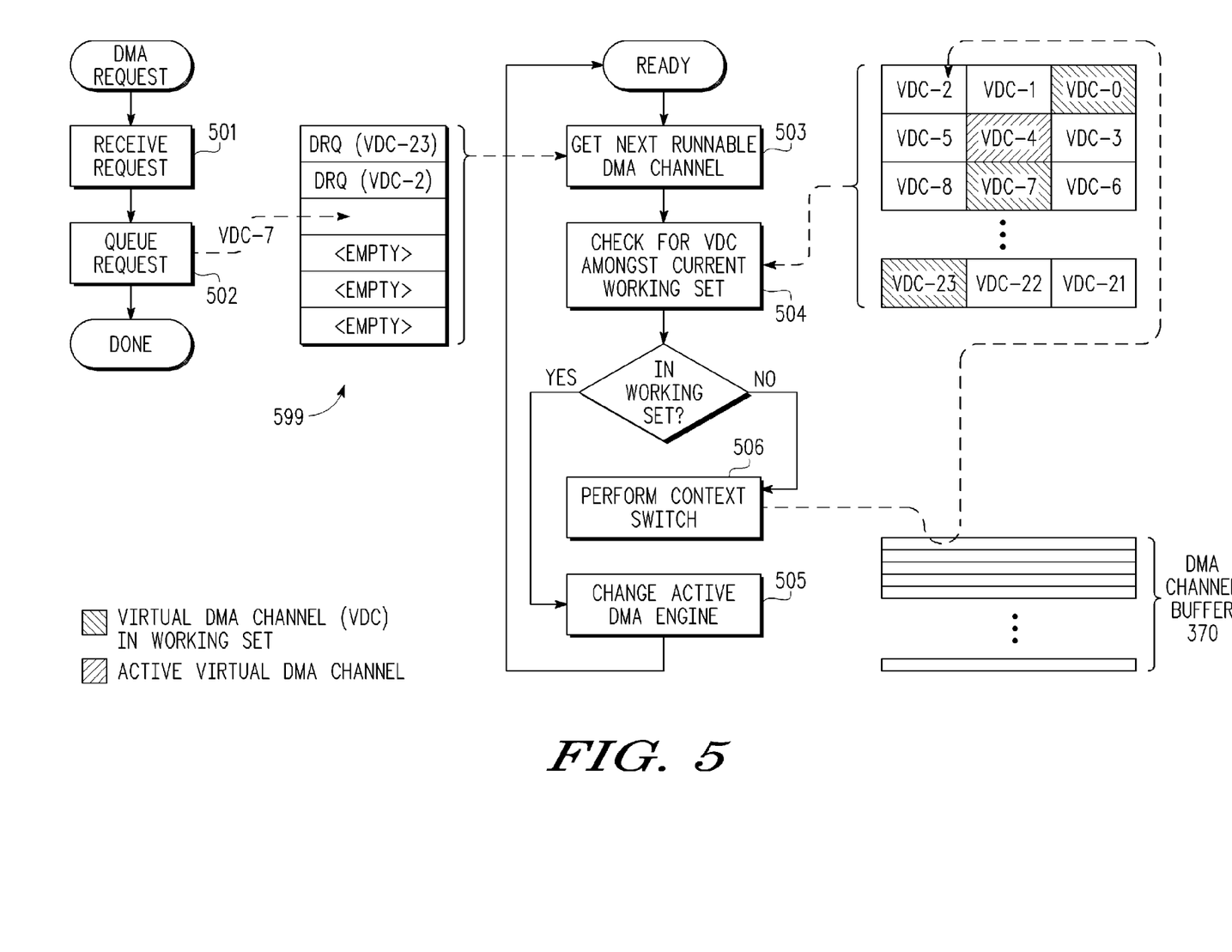
FIG. 5 is a flow chart that illustrates operation of a DMA controller that employs virtual DMA channel techniques in accordance with one or more embodiments of the present invention.

FIG. 5 is a flow chart that illustrates operation of a DMA controller that employs virtual DMA channel techniques in accordance with one or more embodiments of the present invention. In particular, FIG. 5 illustrates the receipt (501) and queuing (502) of DMA requests and illustrates corresponding operations for transition between virtual DMA channels and engines performed by a DMA controller (e.g., by DMA context switch controller 330 of DMA controller 324). In the illustration, a DMA request (DRQ) corresponding to virtual DMA channel VDC-7 is queued in a buffer 599 accessible to the DMA controller. At an appropriate time (e.g., upon completion of VDC-4 transfer or based on a prioritization of transfers), the DMA controller gets (503) information for a next runnable virtual DMA channel (e.g., virtual DMA channel VDC-23) and an associated DMA request from buffer 599. The DMA controller checks (504) to see whether the next runnable virtual DMA channel is in the current working set. If so, the DMA controller need only change (505) from one DMA engine to another and context switch latencies that would otherwise be associated with loading/restoring/saving DMA context information are avoided. Thus, in the illustrated case where the next runnable virtual DMA channel is VDC-23 and VDC-23 is a member of the current working set and is associated with DMA engine 344, the transition can be accomplished (as illustrated in FIG. 4) without context switch delay.

Figure 6:
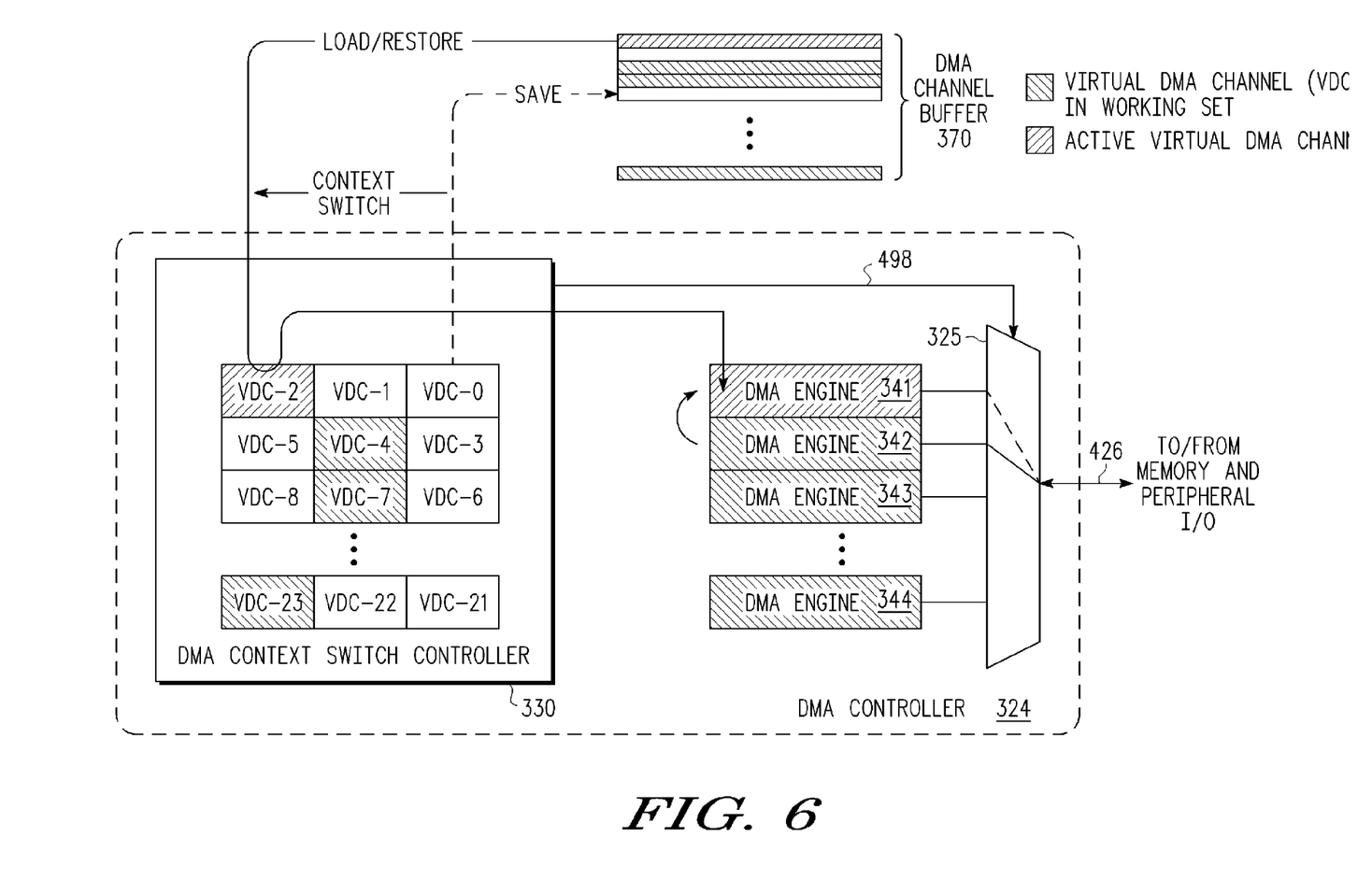
FIG. 6 is a block diagram that illustrates a context switch that updates a working set of virtual DMA channels supported using a DMA controller in accordance with one or more embodiments of the present invention.

If, on the other hand, the next runnable virtual DMA channel is not in the current working set, as would be the case for the next queued DMA request (DRQ) corresponding to virtual DMA channel VDC-2, the DMA controller performs a context switch, loading (or restoring) context information for VDC-2 from DMA channel buffer 370 to an appropriate DMA engine. FIG. 6 illustrates (using a block diagram analogous to that described above with reference to FIG. 4) a context switch that updates the working set of virtual DMA channels to include the next runnable virtual DMA channel. Thus, in the illustrated case where the next runnable virtual DMA channel is VDC-2 but where VDC-2 is not a member of the current working set, the transition can be accomplished (as illustrated in FIG. 6) by loading DMA engine 341 with context information for virtual DMA channel VDC-2 and, in the process, displacing context information for virtual DMA channel VDC-0 (which may optionally be saved to DMA channel buffer 370). Thereafter, DMA context switch controller 330 directs multiplexer 325 (via control 498) to decouple DMA engine 342 from DMA interfaces 426 and to instead couple a DMA engine associated with the next runnable DMA (here DMA engine 341) to appropriate ones of DMA interfaces 426. Note that in some situations or embodiments, DMA context switch controller 330 may proactively displace and load context information (e.g., saving VDC-0, if necessary, and loading/restoring VDC-2 to DMA engine 341) while a prior runnable one of the virtual DMA channels is still active. In this way context, information for a next runnable virtual DMA channel will be cached with a respective DMA engine and available for activation without context switch latency.

Virtual DMA Channel Mapping, Working Sets and Replacement Strategies

Figure 7:
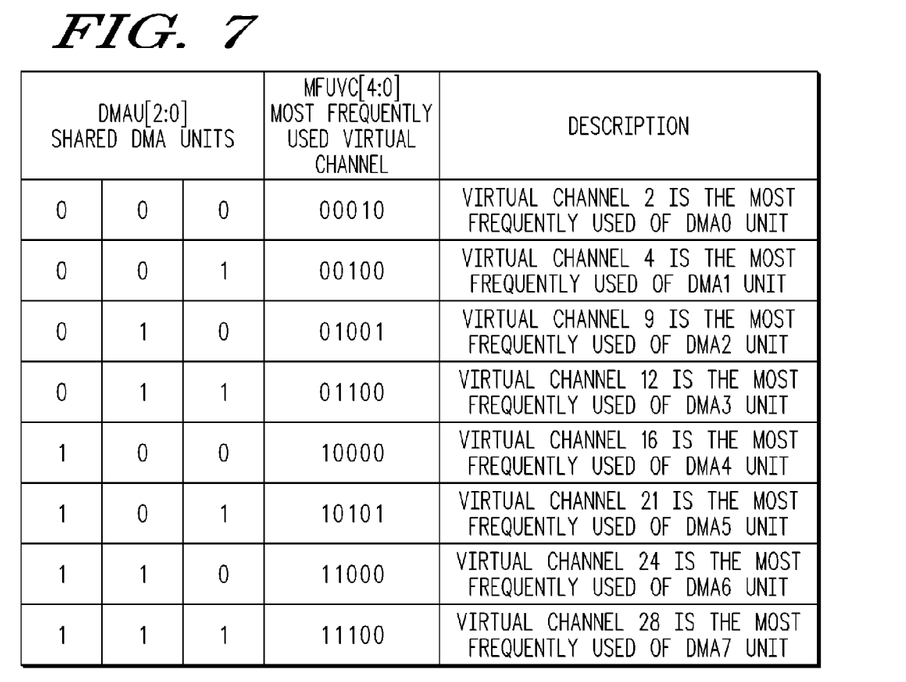
FIG. 7 illustrates control status information codings suitable for use in one or more embodiments of the present invention in which set-oriented virtual DMA channel assignments are employed.
Figure 9:
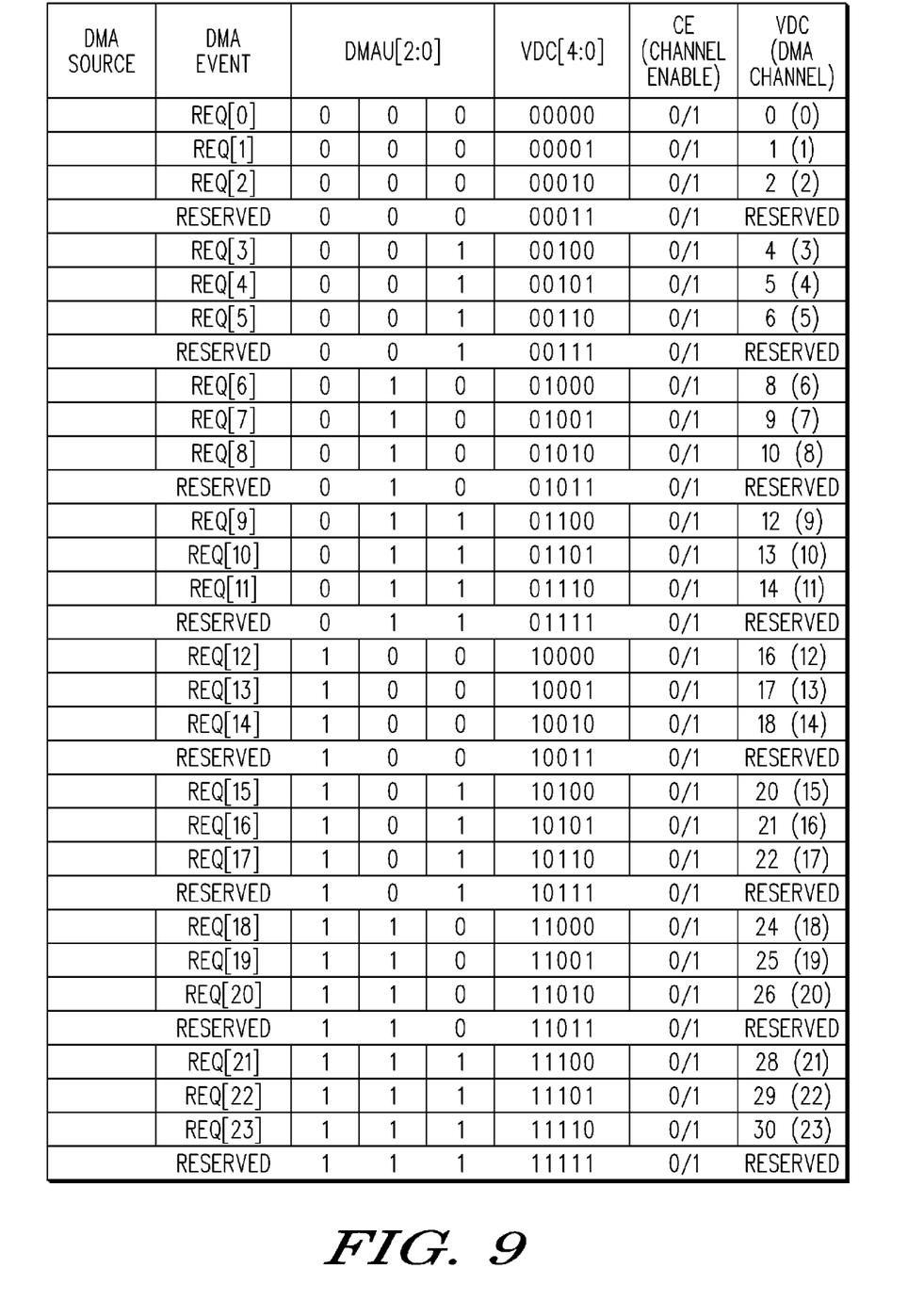
FIG. 9 illustrates control status information codings suitable for use in one or more embodiments of the present invention to track associations of virtual DMA channels with DMA engines.

In general, any of a variety of mapping and/or replacement strategies may be employed to dynamically vary contents of the working set and mappings of a generally-larger number of virtual DMA channels to a generally-smaller number of DMA engines. In some of the preceding examples, a subset of twenty-four (24) virtual DMA channels (VDC-0...VDC-23) were mapped to eight (8) DMA engines (341, 342, 343... 344) based on sets or frames of three (3) virtual DMA channels. In accord with those examples, FIG. 7 is table illustrating control status information codings suitable for use by a DMA controller to track (on a set-oriented basis) a working set of the virtual DMA channels. For example, a control status information coding consistent with that illustrated FIG. 7 allows a DMA controller to track (for each DMA engine) which particular one of three (3) mapped virtual DMA channels is currently in the working set of virtual DMA channels for which context information is already loaded for use by the corresponding DMA engine. In like manner, FIG. 9 illustrates control status information codings suitable for use by a DMA controller to define associations of virtual DMA channels with DMA engines.

In some embodiments or configurations, a DMA controller (e.g. DMA controller 324) implements a replacement strategy that (for each DMA engine) results in, or at least approximates a situation in which, the most frequently used one of the three (3) virtual DMA channels mapped thereto is included in the working set. In some embodiments or configurations, a collection of most recently used ones of the mapped virtual DMA channels constitutes the working set. In some embodiments or configurations, membership in the working set can include (or at least approximate) a collection of most frequently or recently used ones of the virtual DMA channels without regard to set-oriented mappings of virtual DMA channels to DMA engines. In some embodiments or configurations, set-oriented mappings may be programmable using control status information codings such as illustrated in FIG. 9. In some embodiments or configurations, working sets may result from replacement algorithms that implement (or at least approximate) a least frequently or recently used selection of virtual DMA channels to be displaced.

In some situations or embodiments, replacement strategies may seek to proactively displace and load context information (e.g., based on DMA requests (DRQs) queued in a buffer 599) even while a prior runnable one of the virtual DMA channels remains active. In this way context, information for a next runnable virtual DMA channel may be cached with a respective DMA engine and available for activation without context switch latency.

EXAMPLES

In some embodiments, a method of managing direct memory access (DMA) resources in a system that provides plural DMA engines includes associating context information, including DMA parameters, with each of plural virtual DMA channels, the virtual DMA channels more numerous than the DMA engines; for at least a current subset of less than all the virtual DMA channels, caching the associated context information with respective ones of the DMA engines; and switching amongst the DMA engines, and therefore amongst respective ones of the current subset of virtual DMA channels, without latency associated with saving or restoring context information.

In some embodiments, such a method may include saving and restoring context information for respective ones of the virtual DMA channels to and from a DMA channel buffer, thereby updating the current subset of virtual DMA channels for which context information is cached with a respective DMA engine. In some embodiments or situations, saving and restoring may be performed if a next runnable one of the virtual DMA channels is not a member of the current subset. In some embodiments or situations, saving and restoring may be performed while a prior runnable one of the virtual DMA channels is active, such that context information for a next runnable virtual DMA channel is cached with a respective DMA engine and available for activation without context switch latency. In some embodiments, the current subset of virtual DMA channels may be maintained so that respective DMA engines cache context information for (i) a most frequently used subset of the virtual DMA channels, (ii) a most recently used subset of the virtual DMA channels, (iii) a subset of the virtual DMA channels selected based on a set- or frame-oriented implementation of a frequency of use policy or (iv) a subset of the virtual DMA channels selected based on a set- or frame-oriented implementation of a recency of use policy.

In some embodiments, at any given time, each of the virtual DMA channels may be mapped to a respective DMA engine, either as a member of the current subset for which context information is cached or as an uncached entry in a DMA channel buffer. In some embodiments or situations, a single one of the DMA engines and an associated single one of the virtual DMA channels is active at any given time. In some embodiments or situations, switching amongst the DMA engines occurs in about one DMA clock cycle, and saving and restoring, if necessary, has a multi-cycle latency.

In some embodiments, an apparatus includes a Direct Memory Access (DMA) controller suitable for coupling to a DMA channel buffer that stores context information, including DMA parameters, for each of plural virtual DMA channels. The DMA controller includes plural DMA engines each configured to cache context information for a respective one of the virtual DMA channels that together constitute a current subset thereof, the virtual DMA channels more numerous than the DMA engines. The DMA controller also includes a context switching controller configured to switch amongst the DMA engines without substantial context switch latency as long as a next runnable one of the virtual DMA channels is within the current subset for which context information is cached with a respective one of the DMA engines.

In some embodiments, if the next runnable one of the virtual DMA channels is not within the current subset, the context switching controller is configured to load a selected one of the DMA engines with context information retrieved from the DMA channel buffer. In some embodiments or situations, a load has a multi-cycle latency. In some embodiments or situations, the context switching controller saves, coincident with the load, to the DMA channel buffer context information for at least one of the virtual DMA channels of a previously current subset thereof. In some embodiments or situations, the context switching controller initiates the load while a prior runnable one of the virtual DMA channels remains active, such that context information for a next runnable virtual DMA channel is cached with a respective DMA engine and available for activation without context switch latency. In some embodiments, the context switching controller is configured to save and restore context information for respective ones of the virtual DMA channels to and from a DMA channel buffer, thereby updating the current subset of virtual DMA channels for which context information is cached with a respective DMA engine.

In some embodiments, the context switching controller implements a replacement policy that caches in respective ones of the DMA engines context information for (i) a most frequently used subset of the virtual DMA channels, (ii) a most recently used subset of the virtual DMA channels, (iii) a subset of the virtual DMA channels selected based on a set- or frame-oriented implementation of a frequency of use policy or (iv) a subset of the virtual DMA channels selected based on a set- or frame-oriented implementation of a recency of use policy. In some embodiments or situations, a single one of the DMA engines and an associated single one of the virtual DMA channels is active at any given time.

In some embodiments, the apparatus further includes a processor, memory and a data transfer pathway between memory and plural peripherals, each operatively coupled to the DMA controller. In some embodiments, the DMA channel buffer resides in the memory. In some embodiments, the apparatus is embodied as a system on a chip.

In some embodiments, an electronic device includes a processor and memory accessible thereto, a DMA interconnect and a DMA controller. The DMA interconnect couples the memory and plural devices. The DMA controller interfaces with the DMA interconnect and coordinates plural DMA engines to support plural virtual DMA channels. The virtual DMA channels are more numerous than the DMA engines. The DMA controller caches associated context information, including DMA parameters, for at least a current subset of less than all the virtual DMA channels. The DMA controller includes logic to switch amongst the DMA engines, and therefore amongst respective ones of the current subset of virtual DMA channels, without latency associated with saving or restoring context information.

Other Embodiments

Although the invention is described herein with reference to specific embodiments, various modifications and changes can be made without departing from the scope of the present invention as set forth in the claims below. Embodiments of the present invention may be implemented using any of a variety of different information processing systems. Accordingly, while FIGS. 1 and 2, together with their accompanying description relate to exemplary data processing system and DMA architectures, these exemplary architectures are merely illustrative. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, system and apparati that implement the present invention are, for the most part, composed of electronic components, circuits and/or code (e.g., software, firmware and/or microcode) known to those skilled in the art and functionally described herein. Accordingly, component, circuit and code details are explained at a level of detail necessary for clarity, for concreteness and to facilitate an understanding and appreciation of the underlying concepts of the present invention. In some cases, a generalized description of features, structures, components or implementation techniques known in the art is used so as to avoid obfuscation or distraction from the teachings of the present invention.

As used herein, the term "bus" refers generally to a plurality of signals which may be used to transfer one or more various types of information, such as data, addresses, control, or status. Often the plurality of signals correspond to a similar number of conductors or waveguides; however, unless otherwise indicated herein, embodiments may multiplex signals over one or more conductors or waveguides without departing from the spirit and scope of the present invention. In some cases, signals may be transferred using multiplexers or other interconnect logic that presents a bus-type protocol interface to endpoints. Often signal paths are illustrated or described herein as a single path, a plurality of path, unidirectional paths, or bidirectional paths. However, different embodiments may vary the implementation. For example, separate unidirectional paths may be used rather than bidirectional paths and vice versa. Also, plurality of paths may be replaced with a lesser number of path (e.g., a single path) that transfers multiple signals serially or in a time multiplexed manner. Likewise, single conductors carrying multiple signals may be separated out into various different paths carrying subsets of these signals. In short, many suitable design options exist for transferring signals and embodiments of the present invention may employ any suitable design option.

In general, the terms "program" and/or "program code" are used herein to describe a sequence or set of instructions designed for execution on a computer system. As such, such terms may include or encompass subroutines, functions, procedures, object methods, implementations of software methods, interfaces or objects, executable applications, applets, servlets, source, object or intermediate code, shared and/or dynamically loaded/linked libraries and/or other sequences or groups of instructions designed for execution on a computer system.

All or some of the functionality or program code described herein, as well as any software implemented functionality of information processing systems described herein, may be accessed or received by elements of an information processing system, for example, from computer readable media or via other systems. In general, operation of various functional blocks described herein (including e.g., DMA controllers, DMA engines and DMA context switch controllers) may be defined by firmware or code executable on a general-purpose or specialized processor. In general, computer readable media may be permanently, removably or remotely coupled to an information processing system or processor. Computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and media incident to data transmission including transmissions via computer networks, point-to-point telecommunication equipment, and carrier waves or signals, just to name a few.

Finally, the specification and figures are to be regarded in an illustrative rather than a restrictive sense, and consistent with the description herein, a broad range of variations, modifications and extensions are envisioned. Any benefits, advantages, or solutions to problems that are described herein with regard to specific embodiments are not intended to be construed as a critical, required, or essential feature or element of any or all the claims.

What is claimed is:

1. A method of managing direct memory access (DMA) resources in a system that provides plural DMA engines, the method comprising:
    associating context information, including DMA parameters, with each of plural virtual DMA channels, the virtual DMA channels more numerous than the plural DMA engines;
    for at least a current subset of less than all the virtual DMA channels, caching the associated context information with respective ones of the plural DMA engines;
    and switching amongst the plural DMA engines, and therefore amongst respective ones of the current subset of virtual DMA channels, without latency associated with saving or restoring context information.

2. The method of claim 1, further comprising:
    saving and restoring context information for respective ones of the virtual DMA channels to and from a DMA channel buffer, thereby updating the current subset of virtual DMA channels for which context information is cached with a respective DMA engine.

3. The method of claim 1, further comprising:
    performing the saving and restoring if a next runnable one of the virtual DMA channels is not a member of the current subset.

4. The method of claim 1, further comprising:
    performing the saving and restoring while a prior runnable one of the virtual DMA channels is active, such that context information for a next runnable virtual DMA channel is cached with a respective DMA engine and available for activation without context switch latency.

5. The method of claim 1, further comprising maintaining the current subset of virtual DMA channels so that respective DMA engines cache context information for one of:
    a most frequently used subset of the virtual DMA channels;
    a most recently used subset of the virtual DMA channels;
    a subset of the virtual DMA channels selected based on a set- or frame-oriented implementation of a frequency of use policy; and
    a subset of the virtual DMA channels selected based on a set- or frame-oriented implementation of a recency of use policy.

6. The method of claim 1,
    wherein, at any given time, each of the virtual DMA channels is mapped to a respective DMA engine, either as a member of the current subset for which context information is cached or as an uncached entry in a DMA channel buffer.

7. The method of claim 1,
    wherein a single one of the DMA engines and an associated single one of the virtual DMA channels is active at any given time.

8. The method of claim 1,
    wherein the switching amongst the DMA engines occurs in about one DMA clock cycle, and
    wherein the saving and restoring, if necessary, has a multi-cycle latency.

9. An apparatus comprising:
    a Direct Memory Access (DMA) controller suitable for coupling to a DMA channel buffer that stores context information, including DMA parameters, for each of plural virtual DMA channels;
    the DMA controller including plural DMA engines each configured to cache context information for a respective one of the virtual DMA channels that together constitute a current subset thereof, the virtual DMA channels more numerous than the plural DMA engines;
    and the DMA controller including a context switching controller configured to switch amongst the plural DMA engines without substantial context switch latency as long as a next runnable one of the virtual DMA channels is within the current subset for which context information is cached with a respective one of the plural DMA engines.

10. The apparatus of claim 9,
    wherein, if the next runnable one of the virtual DMA channels is not within the current subset, the context switching controller is configured to load a selected one of the DMA engines with context information retrieved from the DMA channel buffer.

11. The apparatus of claim 10,
    the load has a multi-cycle latency.

12. The apparatus of claim 10,
    wherein, coincident with the load, the context switching controller saves to the DMA channel buffer context information for at least one of the virtual DMA channels of a previously current subset thereof.

13. The apparatus of claim 10,
    wherein the context switching controller initiates the load while a prior runnable one of the virtual DMA channels remains active, such that context information for a next runnable virtual DMA channel is cached with a respective DMA engine and available for activation without context switch latency.

14. The apparatus of claim 9,
    wherein the context switching controller is configured to save and restore context information for respective ones of the virtual DMA channels to and from a DMA channel buffer, thereby updating the current subset of virtual DMA channels for which context information is cached with a respective DMA engine.

15. The apparatus of claim 9,
    wherein the context switching controller implements a replacement policy that caches in respective ones of the DMA engines context information for one of:
    a most frequently used subset of the virtual DMA channels;
    a most recently used subset of the virtual DMA channels;
    a subset of the virtual DMA channels selected based on a set- or frame-oriented implementation of a frequency of use policy; and
    a subset of the virtual DMA channels selected based on a set- or frame-oriented implementation of a recency of use policy.

16. The apparatus of claim 9,
    wherein a single one of the DMA engines and an associated single one of the virtual DMA channels is active at any given time.

17. The apparatus of claim 9, further comprising:
    a processor; memory; and a data transfer pathway between memory and plural peripherals, each operatively coupled to the DMA controller.

18. The apparatus of claim 17,
    wherein the DMA channel buffer resides in the memory.

19. The apparatus of claim 17, embodied as a system on a chip.

20. An electronic device comprising:
    a processor and memory accessible thereto;
    a DMA interconnect coupling the memory and plural devices;

and a DMA controller that interfaces with the DMA interconnect and coordinates plural DMA engines to support plural virtual DMA channels, the virtual DMA channels more numerous than the plural DMA engines, the DMA controller caching associated context information, including DMA parameters, for at least a current subset of less than all the virtual DMA channels, the DMA controller including logic to switch amongst the plural DMA engines, and therefore amongst respective ones of the current subset of virtual DMA channels, without latency associated with saving or restoring context information.

* * * * *